Nov. 25, 1969    J. A. LUCCHINO ETAL    3,480,248
CLAMP ASSEMBLY
Filed Nov. 2, 1967    2 Sheets-Sheet 1
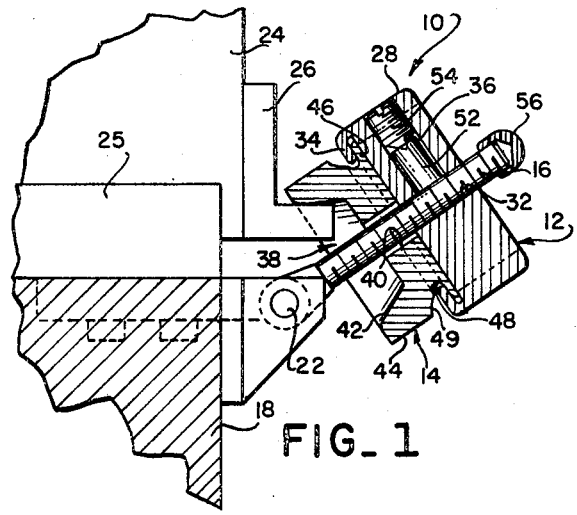
FIG_1
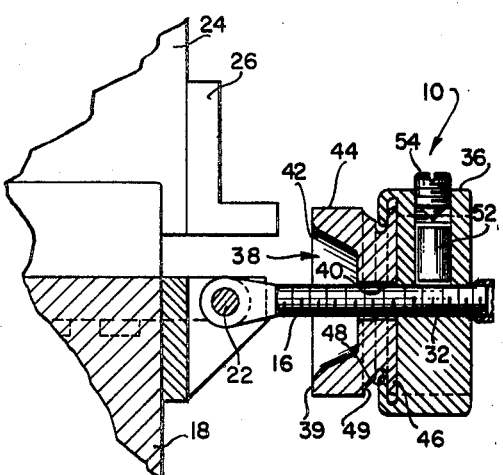
FIG_2
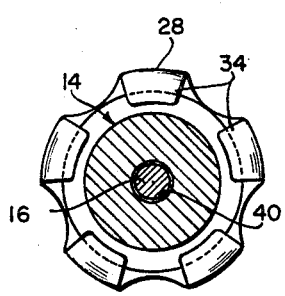
FIG_4
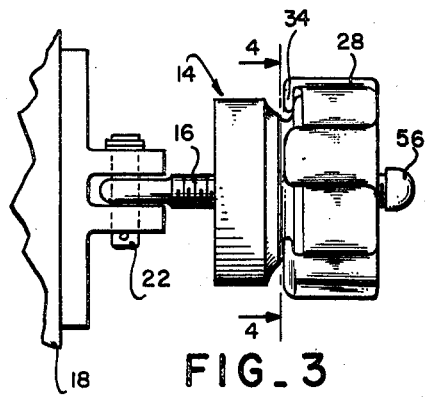
FIG_3
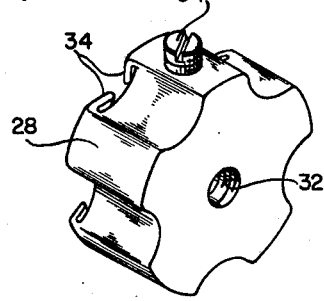
FIG_5
INVENTORS
JOSEPH A. LUCCHINO
JOHN B. BIERBOWER
By George C. Sullivan
Agent

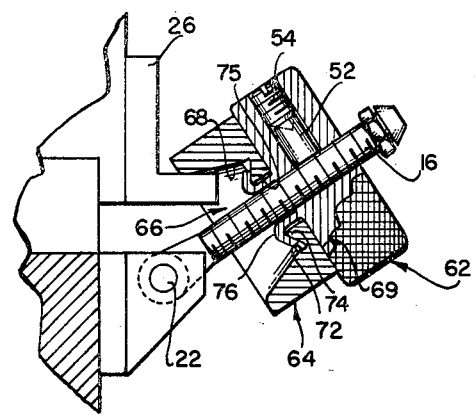
FIG_6
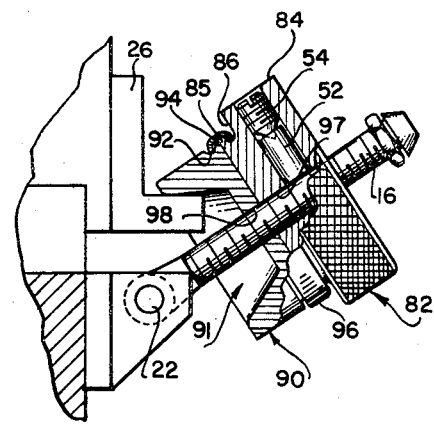
FIG_7
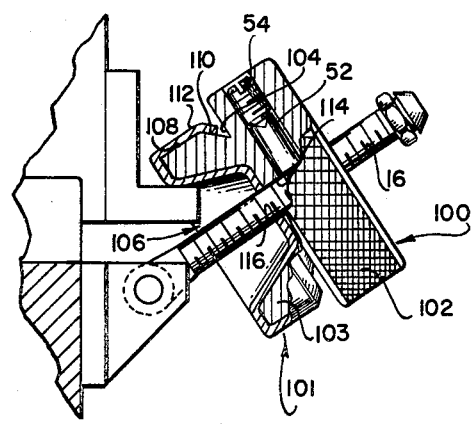
FIG_8

United States Patent Office 3,480,248
Patented Nov. 25, 1969

3,480,248
CLAMP ASSEMBLY
Joseph A. Lucchino, Los Angeles, and John B. Bierbower, Sepulveda, Calif., assignors to Lockheed Aircraft Corporation, Burbank, Calif.
Filed Nov. 2, 1967, Ser. No. 680,131
Int. Cl. B65j 1/22
U.S. Cl. 248—361       10 Claims

ABSTRACT OF THE DISCLOSURE

An adjustable clamp assembly for securing electronic equipment to equipment storage racks, which includes rotatably connected nut and retainer elements. The retainer is captured by means of a plurality of foldable tabs disposed about the circumference of the nut which are inserted into a circumferential groove within the retainer. The nut has a threaded aperture intercommunicating its threaded central axial portion with its outer surface. A nylon pellet and set screw are positioned within the threaded aperture such that as the set screw is advanced, it bears against the nylon pellet causing it to forcibly engage a threaded rod upon which the assembly is retained, thereby controllably inhibiting rotative movement of the nut.

BACKGROUND OF THE INVENTION

*Field of the invention*

This invention relates to a clamp assembly and more particularly to a clamp assembly for securing electronic equipment or the like to associated equipment storage racks.

*Description of the prior art*

Heretofore electronic equipment has been secured to electronic storage racks by means of bolts, screws, or the like, which were thereafter safety wired to prevent accidental removal. In aircraft, as in other vehicles of a military nature, a large amount of shock and vibration is generally encountered. The electronic equipment is, therefore, usually laid or nested within suitable storage racks fixedly attached to the vehicle structure. The electronic equipment is then removably mounted on the racks, by means of bolts or screws which are then subsequently safety wired. More recently, nuts having a cup-like cavity in one face have been untilized. These nuts threadedly engage a pivotally connected threaded element mounted on the equipment rack and capture a rigidly secured angle or bracket connected to the electronic equipment so as to retain the equipment on the rack. The nut is thereafter secured by means of a safety wire attached so as to prevent it from rotating due to vibration, shock, etc., and thereupon disengaging. While this method has proved somewhat satisfactory, there are several inherent disadvantages. One such disadvantage resides in the fact that the safety wire must be severed or unwound when the electronic equipment is removed and upon reinstallation thereof new safety wire must be inserted and secured. This operation requires additional time and effort of the personnel and generally results in sharp wire edges protruding from the equipment racks.

Secondly, use of safety wire does not permit the personnel to readily adjust, maintain, or test for the desired degree of torque without removal thereof.

Still further, and perhaps more importantly, the use of such prior art results in a high degree of friction on the angle and nut interface thereby causing great wear to both members.

SUMMARY OF THE INVENTION

These disadvantages, among others, are overcome by the present invention which, in a preferred embodiment, comprises a retainer having a cup-like cavity disposed in one face thereof adapted to receive an angle or bracket fixedly secured to an electronic equipment casing. A nut, having a plurality of legs or leaves disposed about its circumference is rotatably mounted to the washer by engagement of the leaves within a groove located in the outer periphery of the retainer. A threaded aperture within the nut intercommunicates its central threaded axial portion with its outer surface. When the assemblage threadedly engages a threaded rod or the like pivotally connected to structure, a pellet disposed adjacent the rod is forced into biasing relationship therewith by means of a set screw engaging the threaded aperture thus inhibiting rotating movement. A cap secured to the terminating end of the rod protects the assemblage from inadvertent or accidental disengagement should it for some reason become loosened.

It is therefore an object of the present invention to provide a novel clamp assembly for securing electronic equipment to vehicle structure.

Another object of the invention is to provide a novel clamp assembly for removably mounting casings to vehicle storage racks and wherein the clamp cannot become accidentally disengaged due to shock and vibration.

Another object of the invention is to provide a novel clamp assembly for retaining casings or housings upon their mounting racks and wherein the clamp assembly can be secured to the rack with a preselected degree of force.

Another object of the invention is to provide a clamp assembly which eliminates the necessity for safety wiring.

Other and further objects, features and advantages of the invention will be pointed out hereinafter and set forth in the appended claims forming part of the application.

In the accompanying drawing, several preferred embodiments of the invention are shown by way of illustration and not by way of limitation.

BRIEF DESCRIPTION OF THE DRAWINGS

FIGURE 1 is a side sectional view of the clamp showing the assembly pivotally attached to structure and retaining the equipment bracket.

FIGURE 2 is similar to FIGURE 1 and shows the clamp disengaged from the bracket and with the set screw loosened so that the clamp may rotate.

FIGURE 3 is a side view similar to FIGURE 2 but showing the invention in full section.

FIGURE 4 is a sectional view taken along lines 4—4 of FIGURE 3.

FIGURE 5 is a perspective view of the nut portion of the clamp assembly and shows the set screw threadedly engaging the nut.

FIGURE 6 is a side sectional view of a modified embodiment of the clamp assembly.

FIGURE 7 is a side sectional view of another embodiment of the clamp assembly.

FIGURE 8 is a side sectional view of an additional embodiment of the clamp assembly.

DESCRIPTION OF THE PREFERRED EMBODIMENT

Referring now to the drawings and more particularly to FIGURES 1 through 5 thereof, a clamp assembly is generally indicated in the direction of the numeral 10. The clamp assembly 10 comprises a nut 12 and a retainer or washer 14 which are shown in FIGURES 1 through 3 as being disposed upon a threaded rod or shaft 16. The rod 16 is mounted on an equipment rack 18 by means of a pivotal connector 22. The equipment rack 18 is rigidly secured to the vehicle structure and is adapted to receive an equipment casing or housing 24 upon guide rails 25. The casing 24 has standard L-shaped brackets 26 affixed to the front lower corners thereof as is the general practice within the electrical and electronics industry. Thus, while only one bracket and clamp assembly is illustrated, a plurality may be, and generally are, used.

The nut 12 of the clamp assembly 10 has an outer surface 28 which is fluted and which serves to facilitate ease of attachment and detachment from the threaded rod 16. A threaded hole 32, through the nut 12 about its central axis, is adapted for threaded engagement with the rod 16. The nut 12 addition has a plurality of leaves or tabs 34 circumferentially disposed at one end thereof adjacent the retainer 14 and an aperture 36 which intercommunicates the fluted surface 28 with the threaded hole 32.

The retainer 14 includes a cavity 38 in its side opposite the nut 12 and a hole 40 disposed through its central axis. The cavity 38 is generally cup-like in shape, having a sidewall 42 sloping generally uniformly outwardly as it approaches an outer lip edge 39. The ridge formed between the cavity wall and lip edge is rounded to eliminate any sharpness which could be injurious to personnel or equipment.

The retainer 14 includes an outer circumferential surface 44, a flanged portion 46, and a groove 48 disposed intermediate the flange 46 and the surface 44. The groove 48 extends circumferentially about the retainer 14 and includes a shoulder portion 49 which is curved such that it is adapted to receive the leaves 34 of the nut 12 as they are bent around the flange 46, thereby capturing the retainer 14 and restraining it against axial separation from the nut 12, but allowing it to freely rotate.

Positioned within the aperture 36 are a substantially rigid pellet 52 and a set screw 54 threadedly engaged by aperture 36. The pellet 52 is manufactured from a suitable material, such as nylon, which will not injure the threads of the rod 16 and is positioned intermediate the set screw 54 and the rod 16 so that as the screw 54 is advanced, greater resistance to rotation of the clamp assembly 10 upon the rod 16 is achieved.

Thus, the novel clamp assembly 10 operates as follows. After the equipment casing 24, having brackets 26, is placed upon the guide rails 25, the clamp assembly 10 which is threadedly engaged to and pivotally mounted upon the rod 16 is pivoted into bracket-receiving relationship. The assembly 10 is thereupon tightened to the desired degree such that the angled surface 42 bears against the top surface of the bracket 26. Because the retainer 14 is rotatably mounted to the nut 12 and can freely rotate with respect thereto, the high friction and wear forces inherent to the prior art are overcome. The pellet 52, in the aperture 36, is thereupon forced into engagement with the rod 16 by set screw 54, which is tightened until the pellet 52 stops rotation of the rod 16 or inhibits it by application of force to the extent desired. A wax or potting material (not shown) may thereafter be used to cover or fill the aperture 36 external of the set screw 54 so as to require a reheating and removal thereof before the set screw 54 can be loosened or disengaged completely. A cap 56 which is connected to the end of the rod 16 opposite the connector 22 prevents the assembly 10 from becoming totally disengaged.

In this manner it can be seen that a clamp assembly of high structural integrity and reliability can be obtained.

Referring now to FIGURE 6, a modified embodiment of the present invention is shown comprising a knurled nut 62 and a retainer 64. The retainer 64 includes a cup-like cavity generally indicated in the direction of the numeral 66 having an outwardly sloped sidewall 68. Intermediate the mouth of the cavity 66 and the nut interfacing surface 69, an annular groove 72 is disposed about the central axis and is bounded interiorly by an annular boss 74 and exteriorly by the sidewall 68. The annular boss 74 terminates adjacent an axial hole 75 defined within the retainer 64 and has a generally downwardly sloping surface extending towards the groove 72. The nut 62 includes a collar portion 76 which is of a diameter somewhat less than the diameter of the hole 75 but of a height greater than that of the boss 74. Coupling of the nut 62 to the retainer 64 is accomplished by placing the nut and retainer adjacent each other such that the collar 76 is inserted within the hole 75 and thereupon flared outwardly until it is disposed adjacent the sloped inward portion of the boss 74. In this manner the nut 62 and the retainer 74 are coupled together but are rotatable with respect to one another. As in the embodiment shown in FIGURES 1 through 5, a set screw 54 and pellet 52 are thereupon placed within the aperture 36 and tightened to a desired degree so that the assembly 10 cannot be rotated or is controllably rotatable.

Referring now to FIGURE 7, a modified embodiment is illustrated wherein a nut 82 is shown as having a knurled outer surface 84, a flange 85, and an annular groove 86 disposed intermediate the surface 84 and flange 85. A retainer 90 with a cup-like cavity 91 therein likewise includes an annular groove 92 in its circumference and has an annular flange portion 94 which interfaces the flange portion 85 of the nut 82. The legs of band 96 having a V-shaped cross section extend into the grooves 86 and 92 and act to couple the nut 82 to the retainer 90, such that the retainer 90 may rotate independent of the nut 82 and such that the holes 97 and 98 through the nut 82 and retainer 90, respectively, are in register when threadedly engaged upon the rod 16.

Referring now to FIGURE 8, a nut 100 and a retainer 101 are shown in engagement upon the threaded rod 16. The nut 100 has a knurled outer surface 102, a flange portion 103 and defines an annular groove 104 intermediate the surface 102 and flange portion 103. The flange portion 103 includes a cup-like cavity 106 and has an outer peripheral surface 108, having an inwardly sloping shoulder portion 110 which defines one wall of the groove 104. The retainer 102 is rotatably mounted to the nut 100 by means of a collar portion 112 which is inwardly flared into the groove 104 adjacent the shoulder 110. The nut 100 and retainer 101 define holes 114 and 116, respectively, which are in register when the retainer 101 is rotatably mounted on the nut 100.

It will be understood that other modifications, may be made in the design and arrangement of the parts without departing from the spirit of the invention.

We claim:
1. A clamp device comprising:
   a rack;
   a rod having a threaded portion and an end which is pivotally connected to the rack;
   a nut engaging the threaded portion of the rod and having a transverse aperture extending from the periphery through to the central axially threaded portion of the nut;
   retainer means coaxially disposed with respect to the rod and the nut, and rotatably mounted on the nut, the retainer means having an axially disposed cup-like cavity therein bounded by an outwardly sloping side wall; and,
   locking means disposed within the aperture so as to engage the threaded portion of the rod and thereby secure the rod to the nut.
2. The clamp defined in claim 1 wherein said aperture is threaded, and wherein said locking means comprises:
   a set screw threadedly engaging the threaded aperture; and,
   a pellet disposed within the aperture intermediate the set screw and the rod, whereby the set screw urges the pellet into engagement with the rod to inhibit rotation of the nut with respect to the rod.
3. A clamp device as defined in claim 1 including:
   a plurality of tabs disposed about the periphery of the nut; and
   an annular groove defined in the retainer periphery and adjacent the nut;

whereby the retainer is rotatably mounted to the nut by insertion of the tabs within the annular groove.

4. A clamp device as defined in claim 1, the nut having a collar disposed about its central axis, the collar being flared within the cup-like cavity of the retainer thereby rotatably mounting the retainer to the nut.

5. A clamp device as defined in claim 1 including:
a first annular groove defined in the periphery of the nut;
a second annular groove defined in the periphery of the retainer; and
coupling means disposed within the first and the second annular grooves for rotatably mounting the retainer to the nut.

6. A clamp device as defined in claim 1, the nut having a flange disposed about its central axis and a groove defined in its periphery and the retainer having a collar flared into the groove.

7. A clamp device as defined in claim 1 including a cap removably mounted to the rod opposite the pivotally connected end.

8. A clamp device as defined in claim 4, the retainer provided with a groove axially disposed with the cup-like cavity and receiving the flared collar.

9. A clamp device as defined in claim 5, the coupling means being a substantially annular band.

10. A clamp device comprising:
a rack;
a rod having a threaded portion and an end which is pivotally connected to the rack;
a nut having a central axially threaded portion engaging the threaded portion of the rod and having a threaded transverse aperture extending from the periphery through to the central axially threaded portion and a collar disposed about the central axis;
retainer means rotatably mounted to the nut and coaxially disposed with respect to the rod and the nut and having an axially disposed cup-like cavity therein bounded by an outwardly sloping side wall and an axially disposed groove defined in the cup-like cavity adapted to receive the collar;
a set screw threadedly engaging the threaded aperture; and
a pellet disposed within the aperture whereby the set screw urges the pellet into engagement with the rod to inhibit rotation of the nut with respect to the rod.

References Cited
UNITED STATES PATENTS

| | | | |
|---|---|---|---|
| 2,412,451 | 12/1946 | Foote | 248—406 |
| 3,212,746 | 10/1965 | Wright | 248—361 |
| 3,357,667 | 12/1967 | Trammell | 248—316 XR |

CHANCELLOR E. HARRIS, Primary Examiner

JOHN PETO, Assistant Examiner